(12) United States Patent
Aerni et al.

(10) Patent No.: US 10,984,283 B2
(45) Date of Patent: Apr. 20, 2021

(54) RECOGNITION OF BIASES IN DATA AND MODELS

(71) Applicant: salesforce.com, inc., San Francisco, CA (US)

(72) Inventors: Sarah Aerni, San Francisco, CA (US); Natalie Casey, San Francisco, CA (US); Shubha Nabar, Sunnyvale, CA (US); Melissa Runfeldt, Oakland, CA (US); Sara Beth Asher, Atherton, CA (US)

(73) Assignee: salesforce.com, inc., San Francisco, CA (US)

( * ) Notice: Subject to any disclaimer, the term of this patent is extended or adjusted under 35 U.S.C. 154(b) by 41 days.

(21) Appl. No.: 16/565,922

(22) Filed: Sep. 10, 2019

(65) Prior Publication Data

US 2021/0073579 A1    Mar. 11, 2021

(51) Int. Cl.
*G06K 9/62* (2006.01)
*G06F 17/15* (2006.01)

(52) U.S. Cl.
CPC ........... *G06K 9/6254* (2013.01); *G06F 17/15* (2013.01); *G06K 9/6257* (2013.01); *G06K 9/6263* (2013.01); *G06K 9/6265* (2013.01)

(58) Field of Classification Search
CPC .. G06K 9/6254; G06K 9/6265; G06K 9/6263; G06K 9/6257; G06F 17/15; A61K 2300/00; G06N 20/00; G06Q 99/00; H04L 63/00; B60Q 9/00
USPC ....................................................... 382/159
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A * | 10/1998 | Tonelli | H04L 41/12 |
| | | | 715/853 |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |

(Continued)

*Primary Examiner* — Mahendra R Patel
(74) *Attorney, Agent, or Firm* — LKGlobal | Lorenz & Kopf, LLP

(57) ABSTRACT

A method of training a predictive model to predict a likely field value for one or more user selected fields within an application. The method comprises providing a user interface for user selection of the one or more user selected fields within the application; analyzing a pre-existing, user provided data set of objects; training, based on the analysis, the predictive model; determining, for each user selected field based on the analysis, a confidence function for the predictive model that identifies the percentage of cases predicted correctly at different applied confidence levels, the percentage of cases predicted incorrectly at different applied confidence levels, and the percentage of cases in which the prediction model could not provide a prediction at different applied confidence levels; and providing a user interface for user review of the confidence functions for user selection of confidence threshold levels to be used with the predictive model.

20 Claims, 8 Drawing Sheets

(56) References Cited

U.S. PATENT DOCUMENTS

| | | | |
|---|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 * | 4/2008 | Frankland ............ G06Q 30/018 705/7.12 |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian P et al. |
| 2002/0143997 A1 | 10/2002 | Huang et al. |
| 2002/0162090 A1 | 10/2002 | Parnell et al. |
| 2002/0165742 A1 | 11/2002 | Robbins M |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 * | 9/2004 | Catahan, Jr. ......... G06Q 10/087 705/28 |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0230978 A1 * | 11/2004 | Kraiss ................... G06Q 99/00 718/100 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 * | 10/2008 | Dillon .................. G06F 16/252 706/46 |
| 2009/0030864 A1 * | 1/2009 | Pednault ............. G06K 9/6282 706/45 |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0106548 A1 * | 5/2011 | Hayden ................ G06Q 10/10 705/1.1 |
| 2011/0247051 A1 * | 10/2011 | Bulumulla ............. G06F 21/00 726/4 |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2017/0276676 A1 * | 9/2017 | Slotman ................ G16H 10/20 |
| 2017/0293858 A1 * | 10/2017 | Larsen ............... G06Q 10/1053 |
| 2019/0279111 A1 * | 9/2019 | Merrill .................. G06N 20/20 |
| 2020/0302335 A1 * | 9/2020 | Golding ................ H04L 9/0637 |

* cited by examiner

RECOGNITION OF BIASES IN DATA AND MODELS

TECHNICAL FIELD

Embodiments of the subject matter described herein relate generally to computer systems, and more particularly to systems and methods for identifying bias in a data set used for predictions in a computer system.

BACKGROUND

Products that use simple user interfaces (UIs) and configuration-driven models can automate the process of using artificial intelligence (AI) and machine learning on datasets, but they do not currently provide tools for users to understand biases in their data and processes. Identifying biases towards protected attributes (including but not limited to race, gender, and age) is significant because some user may be prohibited from including certain types of data that explicitly encode protected attributes (e.g., demographic data), for example, for compliance reasons, and many users may not wish to include certain types of data that explicitly encode protected attributes, in their data models generated from their data, for fairness reasons and to protect the perception of their company.

In an effort to prevent a data model from including biased predictions, predictive models may be built by excluding certain fields that are known to explicitly identify subpopulations. The bias encoded explicitly in these fields, however, may still be present implicitly in other fields. This can make it difficult for users to easily understand that bias may still be present and take steps to mitigate the bias that can be introduced into their models.

In addition to implicit bias in specific fields, bias can also be concentrated in certain subsets of data entries. Data is often generated from many different individuals using a variety of processes, some of which may contain bias that could dominate predictive models. Without an ability to identify and remove subsets of data entries that contain bias, a user who is building a model could be forced to choose between either building a highly biased model or one with limited predictive power.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a processor implemented method for excluding biases in data and models is disclosed. The method includes: providing, by a processor, a user interface for user selection of a predicted field wherein the value of the predicted field is to be predicted by a trained prediction model; providing, by the processor, a user interface for user selection of a plurality of data fields to be used by the prediction model to predict the value of the predicted field; analyzing, by the processor, the one or more user selected data fields for bias against a protected class; enumerating, by the processor, one or more of the user selected data fields as containing a bias against a protected class based on the analyzing; providing, by the processor, a user interface for user selection of one or more of the enumerated fields to exclude from the plurality of fields to be used by the prediction model to predict the value of the predicted field; and training, by the processor, the prediction model to be configurable to predict the value of the predicted field using the user selected fields that were not excluded.

In another embodiment, a system for excluding biases in data and models is disclosed. The system includes one or more processors configured by programming instructions on computer readable media. The system is configured to: provide a user interface for user selection of a predicted field wherein the value of the predicted field is to be predicted by a trained prediction model; provide a user interface for user selection of a plurality of data fields to be used by the prediction model to predict the value of the predicted field; analyze the one or more user selected data fields for bias against a protected class; enumerate one or more of the user selected data fields as containing a bias against a protected class based on the analyzing; provide a user interface for user selection of one or more of the enumerated fields to exclude from the plurality of fields to be used by the prediction model to predict the value of the predicted field; and train the prediction model to be configurable to predict the value of the predicted field using the user selected fields that were not excluded.

In another embodiment, computer readable media encoded with programming instructions configurable to cause a processor to perform a method is disclosed. The method includes: providing a user interface for user selection of a predicted field wherein the value of the predicted field is to be predicted by a trained prediction model; providing a user interface for user selection of a plurality of data fields to be used by the prediction model to predict the value of the predicted field; analyzing the one or more user selected data fields for bias against a protected class; enumerating one or more of the user selected data fields as containing a bias against a protected class based on the analyzing; providing a user interface for user selection of one or more of the enumerated fields to exclude from the plurality of fields to be used by the prediction model to predict the value of the predicted field; and training the prediction model to be configurable to predict the value of the predicted field using the user selected fields that were not excluded.

In another embodiment, a computing system comprising a processor and computer readable media encoded with programming instructions configurable to cause the processor to perform a method is disclosed. The method includes: providing a user interface for user selection of a predicted field wherein the value of the predicted field is to be predicted by a trained prediction model; providing a user interface for user selection of a plurality of data fields to be used by the prediction model to predict the value of the predicted field; analyzing the one or more user selected data fields for bias against a protected class; enumerating one or more of the user selected data fields as containing a bias against a protected class based on the analyzing; providing a user interface for user selection of one or more of the enumerated fields to exclude from the plurality of fields to be used by the prediction model to predict the value of the predicted field; and training the prediction model to be configurable to predict the value of the predicted field using the user selected fields that were not excluded.

Furthermore, other desirable features and characteristics will become apparent from the subsequent detailed description and the appended claims, taken in conjunction with the accompanying drawings and the preceding background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Disclosed herein are systems, apparatus, methods and techniques intended to bring transparency to identifying bias in datasets used for predictive models, and to make it easier for individuals building models using automated machine learning systems to discover the use of protected attributes resulting in biased models.

Figure 1:
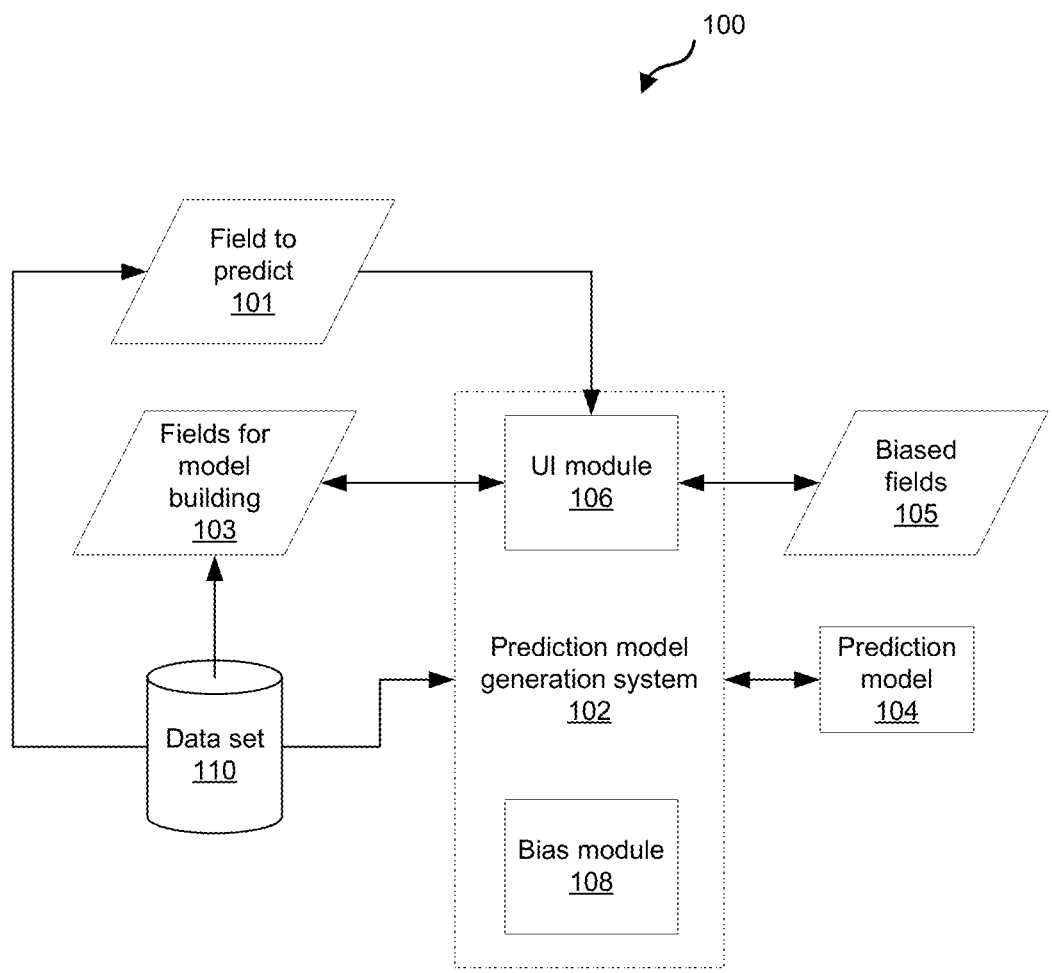
FIG. 1 is a block diagram depicting an example computing system that can implement aspects of the described systems, apparatus, methods and techniques, in accordance with some embodiments.

FIG. 1 is a block diagram depicting an example computing system 100 that can implement aspects of the described systems, apparatus, methods and techniques. The example computing system 100 includes a prediction model generation system 102 that is configured to generate a prediction model 104 for predicting a field value of an object based on various fields from objects within a dataset 110. The prediction model generation system 102 includes a user interface (UI) module 106 for generating user interfaces (UIs) for use by a user to identify a field 101 to predict and fields 103 for use in building a predictive model 104 that can predict the value of the field 101. The prediction model generation system 102 is configured to generate a listing of potentially biased fields 105 from the fields 103 for building the model, and the user interface module is configured to provide a user interface for the user to view the listing of potentially biased fields 105 and to select fields from the biased fields 105 to exclude from use in building the predictive model 104 An object may be any number of data items such as an object from a user, an object about a user, and others.

The example prediction model generation system 102 is implemented by a controller. The controller includes at least one processor and a computer-readable storage device or media. The processor may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in implementing the example prediction model generation system 102.

The instructions may include one or more separate programs, each of which comprises an ordered listing of executable instructions for implementing logical functions. The instructions, when executed by the processor, receive and process data, perform logic, calculations, methods and/or algorithms for implementing the example prediction model generation system 102.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

Figure 2:
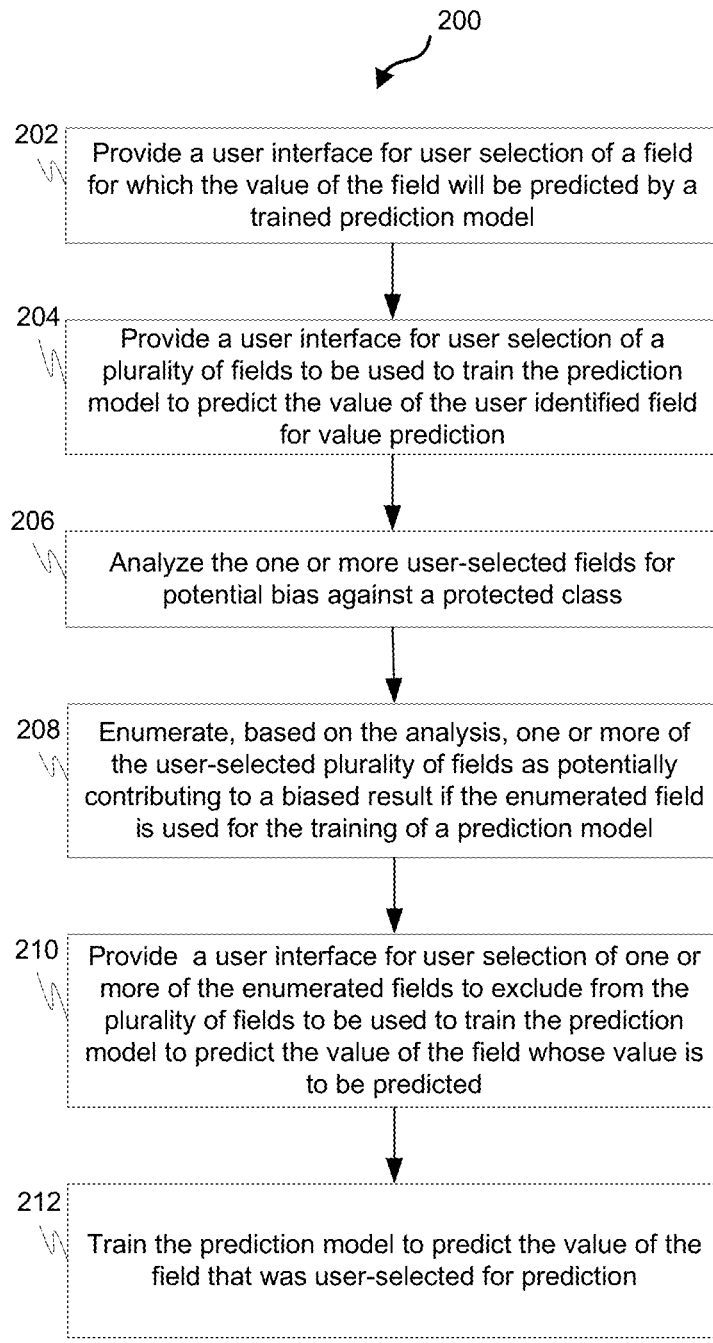
FIG. 2 is a process flow chart depicting an example process implemented by the example prediction model generation system for identifying bias in datasets, in accordance with some embodiments.

FIG. 2 is a process flow chart depicting an example process 200 implemented by the example prediction model generation system 102 for identifying bias in datasets. The order of operation within the example process 200 is not limited to the sequential execution as illustrated in the figure, but may be performed in one or more varying orders as applicable and in accordance with the present disclosure.

The example process 200 includes providing a user interface for user selection of a field (e.g., of an object in a database system) for which a prediction model (e.g., prediction model 104) will be trained to predict the value of the field (operation 202). The user interface may be provided via a user interface module 106 in the example prediction model generation system 102.

The example process 200 includes providing a user interface for user selection of a plurality of fields (e.g., of one or more objects in the database) to be used to train the prediction model to predict the value of the field that was user-selected for prediction (operation 204). The user interface may be provided via the user interface module 106 in the example prediction model generation system 102.

The example process 200 includes analyzing the one or more user-selected fields for potential bias against a protected class (operation 206) and enumerating, based on the analysis, one or more of the user-selected plurality of fields as potentially contributing to a biased result if the enumerated field is used for the training of a prediction model (operation 208). The protected class may include one or more of age, gender, ethnicity. The analyzing and enumerating may be performed by the bias module 108 in the example prediction model generation system 102. The analyzing and enumerating may include determining a bias score for each enumerated field.

The analyzing the one or more user-selected fields for potential bias against a protected class may include analyzing the one or more user-selected plurality of fields for bias against a protected class using statistical tests to identify relationships that may indicate a bias. The statistical tests may include univariate analyses for continuous or binary variables against protected attributes. The univariate analyses may include correlations or t-tests. The correlations or t-tests may be for a continuous variable versus a male/not male indicator variable derived from a first name. The statistical test may include multi-variate analyses for categorical fields. The multi-variate analyses for categorical fields may include Cramer's V tests. The Cramer's V tests may be for the limited derived categorical values from the field against a male/not male indicator variable derived from a first name. The statistical test may include multi-variate analyses for text fields. The multi-variate analyses for text fields may include Cramer's V tests. The Cramer's V tests may be for the limited derived hash buckets of the text against a male/not male indicator variable derived from a first name.

The example process 200 includes presenting the enumerated fields to the user via a user interface and receiving via the user interface user selection of one or more of the enumerated fields to exclude from the plurality of fields to be used to train the prediction model to predict the value of the field whose value is to be predicted (operation 210). The user interface may be provided via the user interface module 106 in the example prediction model generation system 102. The presenting the enumerated fields to the user via a user interface may include presenting each enumerated field and the bias score for each enumerated field in the user interface.

The example process 200 includes training the prediction model to predict the value of the field that was user-selected for prediction (operation 212). The prediction model may include a classification (binary or multi-class) or regressions. The training model may be trained using known machine learning training techniques such as linear regression, random forest, generalized linear model, poison regression, logistic regression and others.

After training, the prediction model may be used to predict the value of the field that was user-selected for prediction using the user-selected plurality of fields used for training.

Figure 3:
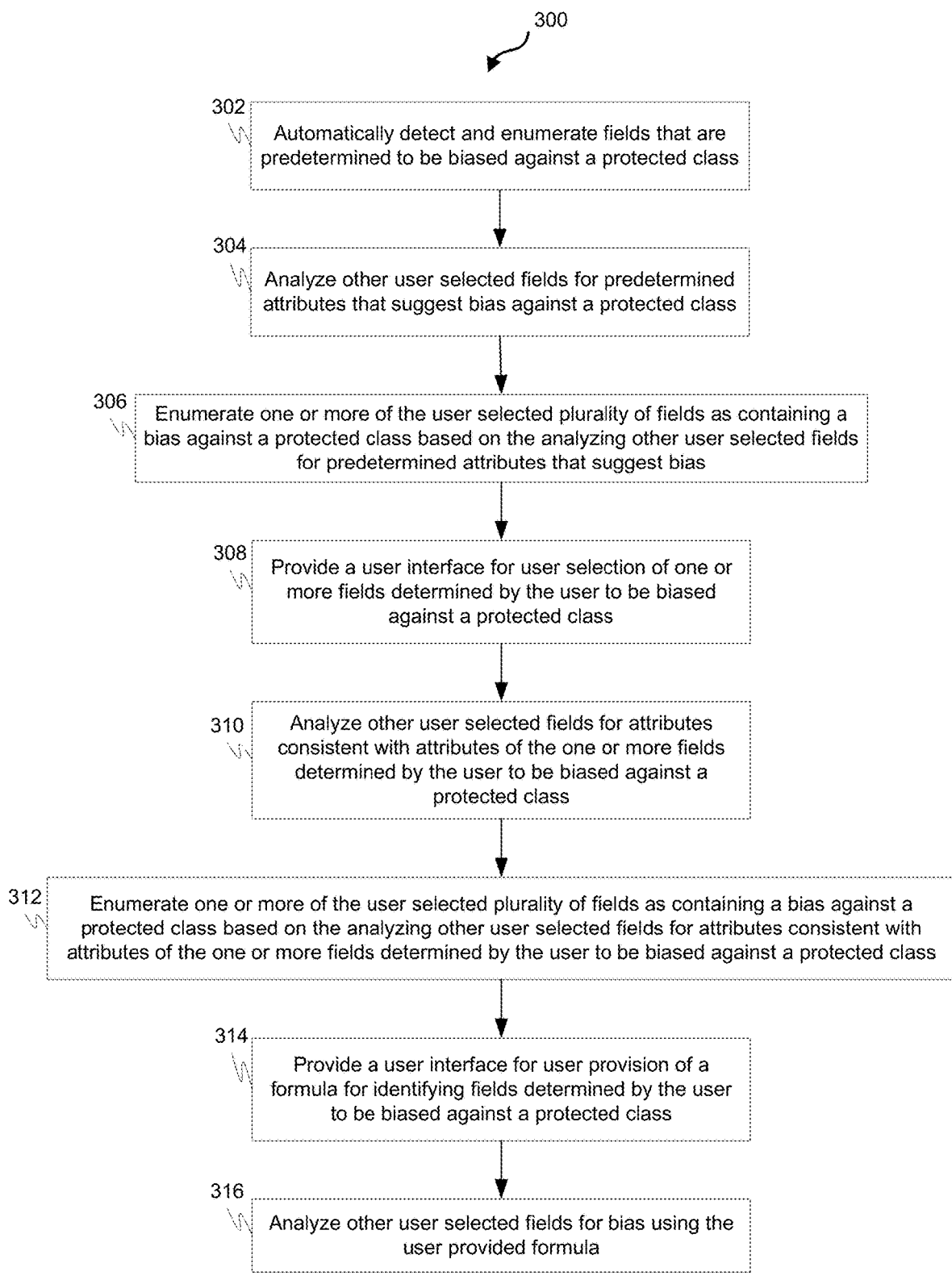
FIG. 3 is a process flow chart depicting an example process implemented by the example prediction model generation system for enumerating fields that if used may result in a biased output, in accordance with some embodiments.

FIG. 3 is a process flow chart depicting an example process 300 implemented by the example prediction model generation system 102 (e.g., the bias module 108) for enumerating fields that if used may result in a biased output. The order of operation within the example process 300 is not limited to the sequential execution as illustrated in the figure, but may be performed in one or more varying orders as applicable and in accordance with the present disclosure.

The example process 300 includes automatically detecting and enumerating fields that are predetermined to be biased against a protected class (operation 302) (e.g., First name~gender transformation, last name~ethnicity transformation, birthdate~age transformation, zip code—demographic information, etc.); analyzing other user selected fields for predetermined attributes that suggest bias against a protected class (operation 304); and enumerating one or more of the user selected plurality of fields as containing a bias against a protected class based on the analyzing other user selected fields for predetermined attributes that suggest bias (operation 306).

The example process 300 includes providing a user interface for user selection of one or more fields determined by the user to be biased against a protected class (operation 308); analyzing other user selected fields for attributes consistent with attributes of the one or more fields determined by the user to be biased against a protected class (operation 310); and enumerating one or more of the user selected plurality of fields as containing a bias against a protected class based on the analyzing other user selected fields for attributes consistent with attributes of the one or more fields determined by the user to be biased against a protected class (operation 312).

The example process 300 includes providing a user interface for user provision of a formula for identifying fields determined by the user to be biased against a protected class (operation 314); and analyzing other user selected fields for bias using the user provided formula (operation 316).

Figure 4:
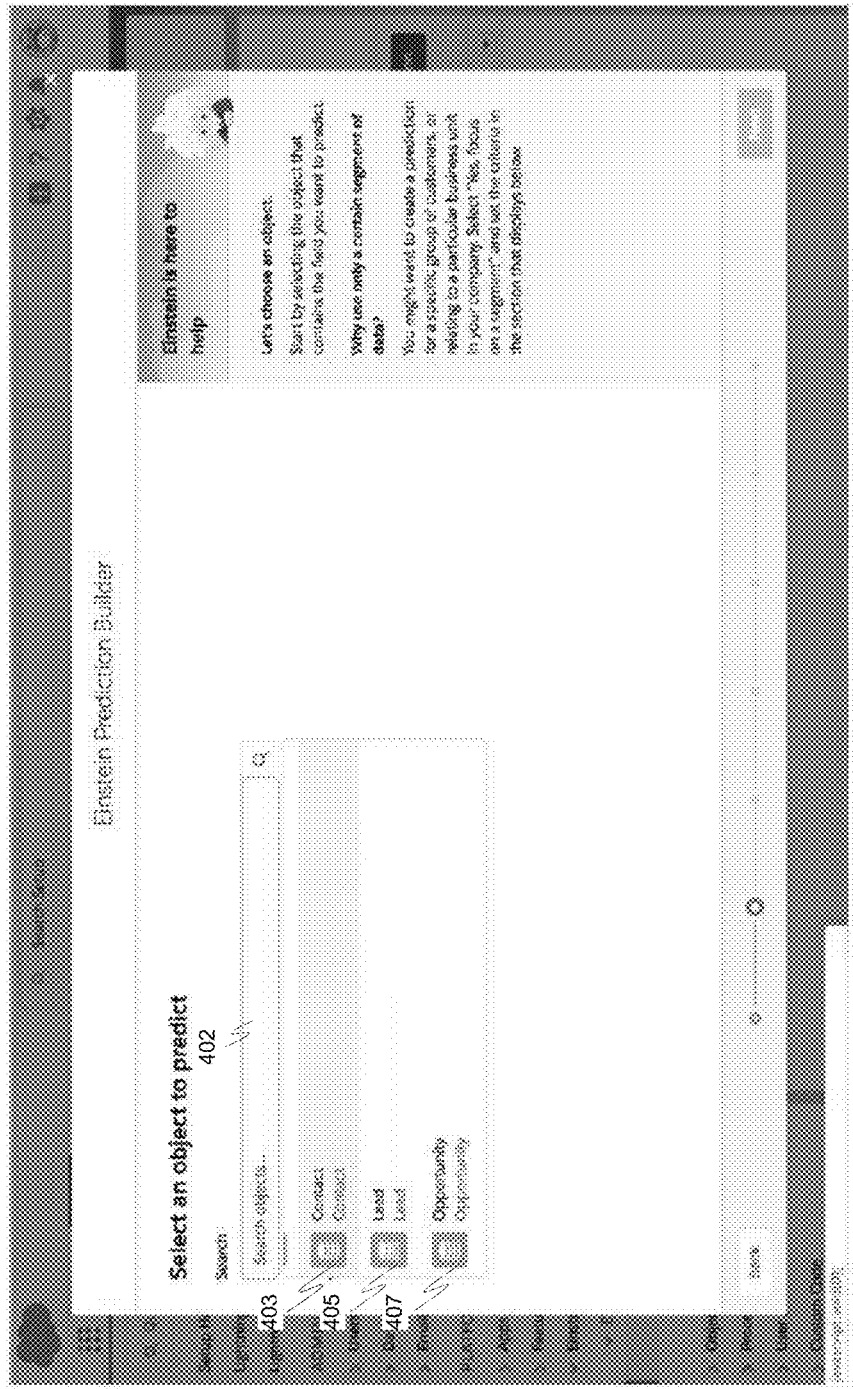
FIG. 4 is an example screenshot of a graphical user interface (GUI) that illustrates user selection features provided by an example UI module in an example prediction model generation system, in accordance with some embodiments.

Depicted in FIG. 4 is an example screenshot of a graphical user interface (GUI) 400 that illustrates user selection features provided by an example UI module 106 in an example prediction model generation system 102. In this example, the GUI 400 includes an object selection widget 402 for user-selection of an object (e.g., objects 403, 405, 407) to predict. Through user selection, a user can indicate, to the example prediction model generation system 102, an object containing a field for which the user desires the field value to be predicted.

Figure 5:
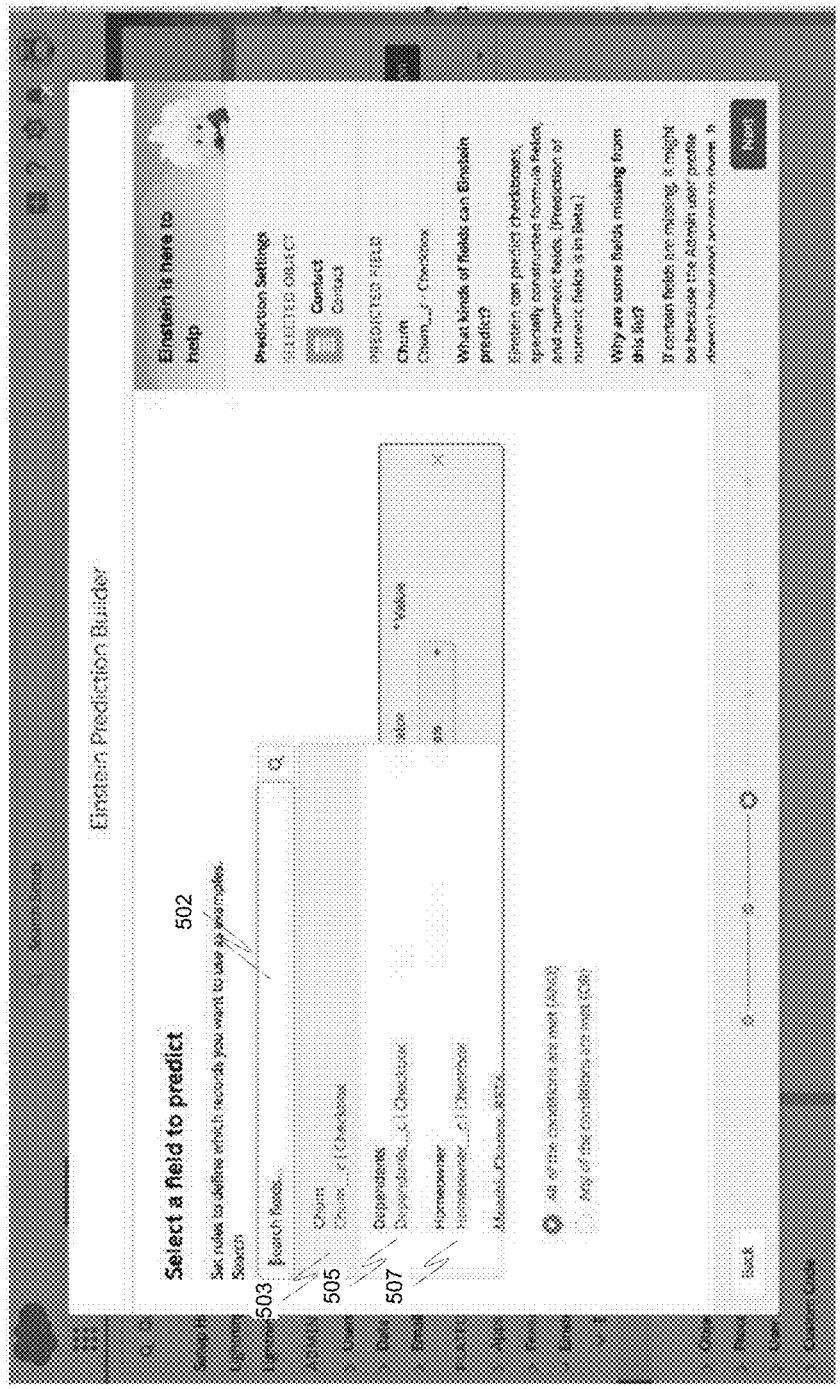
FIG. 5 is an example screenshot of a GUI that illustrates user selection features provided by an example UI module in an example prediction model generation system, in accordance with some embodiments.

Depicted in FIG. 5 is an example screenshot of a GUI 500 that illustrates user selection features provided by an example UI module 106 in an example prediction model generation system 102. In this example, the GUI 500 includes a field selection widget 502 for user-selection of a field (e.g., fields 503, 505, 507) the user desires to be predicted. Through user selection, a user can indicate, to the example prediction model generation system 102, a field for which the user desires the field value to be predicted.

Figure 6:
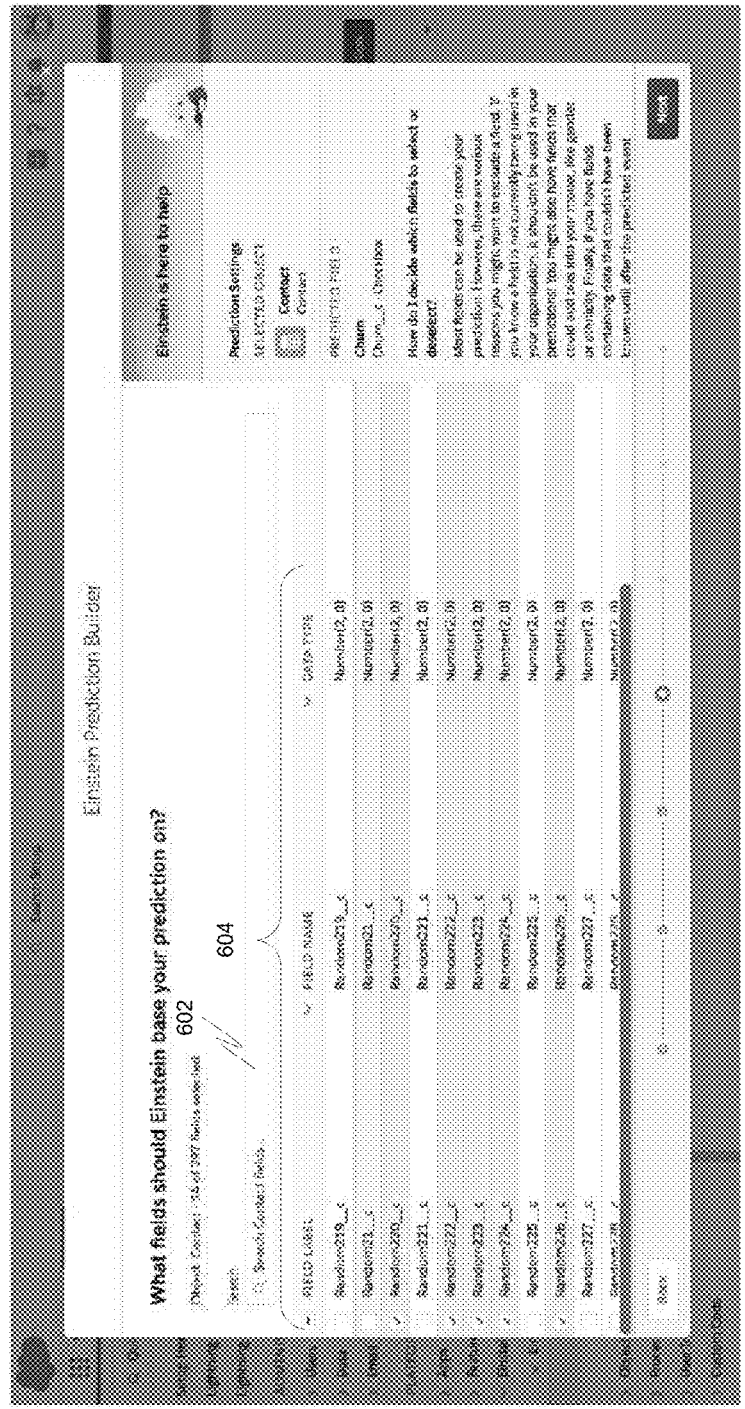
FIG. 6 is an example screenshot of a GUI that illustrates user selection features provided by an example UI module in an example prediction model generation system, in accordance with some embodiments.

Depicted in FIG. 6 is an example screenshot of a GUI 600 that illustrates user selection features provided by an example UI module 106 in an example prediction model generation system 102. In this example, the GUI 600 includes a field selection widget 602 for user-selection of a plurality of fields from fields 604 on which the example prediction model generation system 102 can train the prediction model (e.g., prediction model 104) to base its prediction on.

Figure 7:
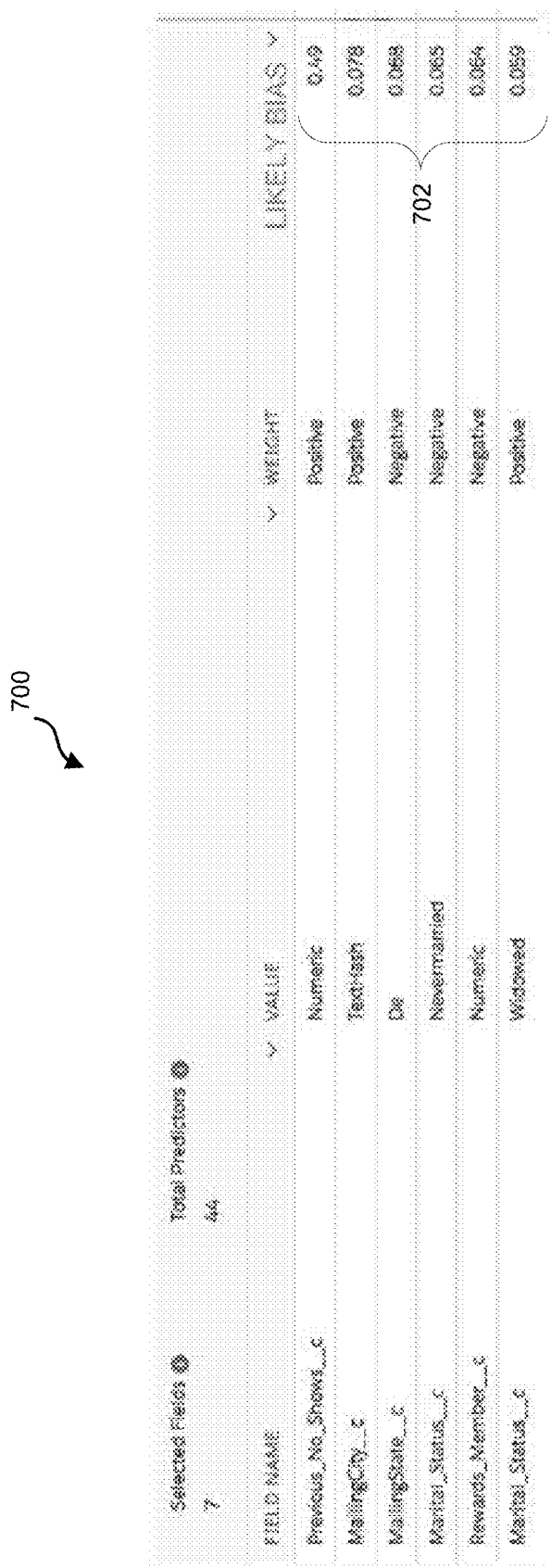
FIG. 7 is an example table provided by the example model generation module that can provide a user with a bias score for various fields, in accordance with some embodiments.

Depicted in FIG. 7 is an example table 700 provided by the example model generation module 106 that can provide a user with a bias score 702 for various fields.

Figure 8:
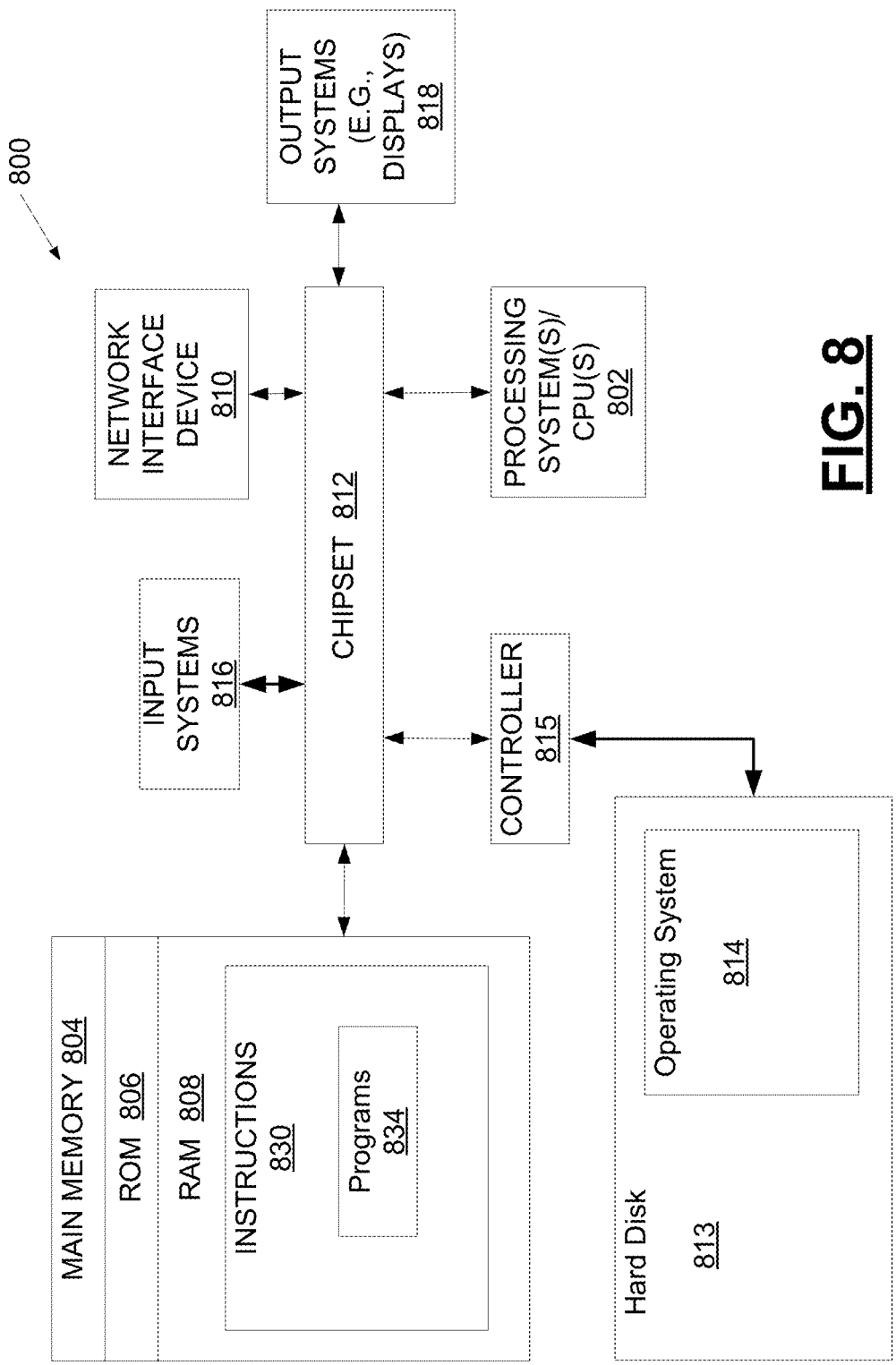
FIG. 8 is a schematic block diagram of an example computer system that can be used to implement the techniques and methods described herein, in accordance with some embodiments.

FIG. 8 is a schematic block diagram of an example computer system that can be used to implement the techniques and methods described herein. The example computer system can include one or more processing system(s) 802, main memory 804, a network interface device (NID) 810, a chipset 812, a hard disk 813 and hard disk controller 815, input systems 816, and output systems 818.

The chipset 812 is usually located on a motherboard and is a set of electronic components (e.g., in an integrated circuit) that interconnects and manages the data flow between the processing system(s) 802 and other elements of the computer system and connected peripherals. For instance, the chipset 812 provides an interface between the processing system(s) 802 and the main memory 804, and also includes functionality for providing network connectivity through the NID 810, such as a gigabit Ethernet adapter. The chipset 812 typically contains the processor bus interface (also known as a front-side bus), memory controllers, bus controllers, I/O controllers, etc.

Processing system(s) 802 represents one or more general-purpose processing devices such as a microprocessor, central processing unit, or the like. More particularly, the processing system(s) 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 802 may also be one or more special-purpose processing devices such as an application specific integrated circuit (ASIC), a field programmable gate array (FPGA), a digital signal processor (DSP), network processor, or the like.

The processing system(s) 802 can include one or more central processing units (CPUs) that operate in conjunction with the chipset 812. The processing system(s) 802 perform arithmetic and logical operations necessary for the operation of the example computer system.

The NID 810 is capable of connecting the example computer system to other computers over a network. The network can be an Ethernet or Gigabyte Ethernet LAN, a fiber ring, a fiber star, wireless, optical, satellite, a WAN, a MAN, or any other network technology, topology, protocol, or combination thereof.

Input system(s) 816 (or input device(s)) allow a user to input information to the computer system and can include things such as a keyboard, a mouse or other cursor pointing device, a pen, a voice input device, a touch input device, a webcam device, a microphone, etc. Output system(s) 818 (or output device(s)) present information to the user of the computer system and can include things such as a display, monitor, speakers, or the like.

The chipset 812 can provide an interface to various forms of computer-readable storage media including a main memory 804 (e.g., read-only memory (ROM), flash memory, dynamic random access memory (DRAM) such as synchronous DRAM (SDRAM)), and hard disk 813. The processing system(s) 802 can communicate with the various forms of computer-readable storage media via the chipset 812 and appropriate buses.

A hard disk 813 is a form of non-volatile memory that can store an operating system (OS) 814. The operating system 814 is software that is copied into RAM and executed by the processing system(s) 802 to control the operation of the example computer system, manage computer hardware and software resources, and provide common services for computer programs executed by the processing system(s) 802. Regardless of the implementation, the operating system 814 includes many different "components" that make the different parts of the example computer system work together. The disk controller 815 is the controller circuit which enables the processing system 802 to communicate with a hard disk 813, and provides an interface between the hard disk 813 and the bus connecting it to the rest of the system.

The main memory 804 may be composed of many different types of memory components. The main memory 804 can include non-volatile memory (such as read-only memory (ROM) 806, flash memory, etc.), volatile memory (such as random access memory (RAM) 808), or some combination of the two. The RAM 808 can be any type of suitable random access memory including the various types of dynamic random access memory (DRAM) such as SDRAM, the various types of static RAM (SRAM). The main memory 804 (as well as the processing system(s) 802) may be distributed throughout the example computer system.

The ROM 806 of the main memory 804 can be used to store firmware that includes program code containing the basic routines that help to start up the example computer system and to transfer information between elements within the example computer system. The ROM of the main memory 804 may also store other software components necessary for the operation of the example computer system.

The RAM 808 stores programs/instructions 830 or executable code for one or more programs 834 that can be loaded and executed at processing system(s) 802 to perform various functions. The programs/instructions 830 are computer readable program code that can be stored in RAM 808 (or other a non-transitory computer readable medium of the example computer system) that can be read and executed by processing system(s) 802 to perform various acts, tasks, functions, and steps as described herein. The methods and techniques described herein can be captured in programming instructions 830 for execution by the processing system 802 to cause the example computer system to perform the described methods, processes, and techniques.

In one embodiment, a processor implemented method for excluding biases in data and models is provided. The method comprises: providing, by a processor, a user interface for user selection of a predicted field wherein the value of the predicted field is to be predicted by a trained prediction model; providing, by the processor, a user interface for user selection of a plurality of data fields to be used by the prediction model to predict the value of the predicted field; analyzing, by the processor, the one or more user selected data fields for bias against a protected class; enumerating, by the processor, one or more of the user selected data fields as containing a bias against a protected class based on the analyzing; providing, by the processor, a user interface for user selection of one or more of the enumerated fields to exclude from the plurality of fields to be used by the prediction model to predict the value of the predicted field; and training, by the processor, the prediction model to be configurable to predict the value of the predicted field using the user selected fields that were not excluded.

These aspects and other embodiments may include one or more of the following features. The enumerating may comprise: automatically detecting and enumerating fields that are predetermined to be biased against a protected class; analyzing other user selected fields for predetermined attributes that suggest bias against a protected class; and enumerating one or more of the user selected plurality of fields as containing a bias against a protected class based on the analyzing other user selected fields for predetermined attributes that suggest bias. The method may further comprise: providing a user interface for user selection of one or more fields determined by the user to be biased against a protected class; and analyzing other user selected fields for attributes consistent with attributes of the one or more fields determined by the user to be biased against a protected class. The method may further comprise: providing a user interface for user provision of a formula for identifying fields determined by the user to be biased against a protected class; and analyzing other user selected fields for bias using the user provided formula. The method may further comprise: determining a bias score for each enumerated field; and presenting in a user interface each enumerated field and the bias score for each enumerated field. The bias score may be a normalized value or some other form of re-scaled value. The analyzing the one or more user selected plurality of fields for bias against a protected class may comprise analyzing the one or more user selected plurality of fields for bias against a protected class using statistical tests to identify relationships that may indicate a bias. The statistical test may comprise univariate analyses for continuous or binary variables against protected attributes. The univariate analyses may comprise correlations or t-tests. The statistical test may comprise multi-variate analyses for categorical fields. The multi-variate analyses for categorical fields may comprise Cramer's V tests. The statistical test may comprise multi-variate analyses for text fields. The multi-variate analyses for text fields may comprise Cramer's V tests. The protected class may comprise one or more of age, gender, ethnicity.

In another embodiment, a system for excluding biases in data and models is provided. The system comprises one or more processors configured by programming instructions on computer readable media. The system is configured to: provide a user interface for user selection of a predicted field wherein the value of the predicted field is to be predicted by a trained prediction model; provide a user interface for user selection of a plurality of data fields to be used by the prediction model to predict the value of the predicted field; analyze the one or more user selected data fields for bias against a protected class; enumerate one or more of the user selected data fields as containing a bias against a protected class based on the analyzing; provide a user interface for user selection of one or more of the enumerated fields to exclude from the plurality of fields to be used by the prediction model to predict the value of the predicted field; and train the prediction model to be configurable to predict the value of the predicted field using the user selected fields that were not excluded.

These aspects and other embodiments may include one or more of the following features. To enumerate the system is configured to: automatically detect and enumerate fields that are predetermined to be biased against a protected class; analyze other user selected fields for predetermined attributes that suggest bias against a protected class; and enumerate one or more of the user selected plurality of fields as containing a bias against a protected class based on the analyzing other user selected fields for predetermined attributes that suggest bias. The system may be further configured to: provide a user interface for user selection of one or more fields determined by the user to be biased against a protected class; analyze other user selected fields for attributes consistent with attributes of the one or more fields determined by the user to be biased against a protected class. The system may be further configured to: provide a user interface for user provision of a formula for identifying fields determined by the user to be biased against a protected class; analyze other user selected fields for bias using the user provided formula. The system may be further configured to: determine a bias score for each enumerated field; and present in a user interface each enumerated field and the bias score for each enumerated field. To analyze the one or more user selected plurality of fields for bias against a protected class the system may be configured to analyze the one or more user selected plurality of fields for bias against a protected class using statistical tests to identify relationships that may indicate a bias. The statistical test may comprise univariate analyses for continuous or binary variables against protected attributes. The univariate analyses may comprise correlations or t-tests. The statistical test may comprise multi-variate analyses for categorical fields. The multi-variate analyses for categorical fields may comprise Cramer's V tests. The statistical test may comprise multi-variate analyses for text fields. The multi-variate analyses for text fields may comprise Cramer's V tests. The protected class may comprise one or more of age, gender, ethnicity.

In another embodiment, computer readable media encoded with programming instructions configurable to cause a processor to perform a method is provided. The method comprises: providing a user interface for user selection of a predicted field wherein the value of the predicted field is to be predicted by a trained prediction model; providing a user interface for user selection of a plurality of data fields to be used by the prediction model to predict the value of the predicted field; analyzing the one or more user selected data fields for bias against a protected class; enumerating one or more of the user selected data fields as containing a bias against a protected class based on the analyzing; providing a user interface for user selection of one or more of the enumerated fields to exclude from the plurality of fields to be used by the prediction model to predict the value of the predicted field; and training the prediction model to be configurable to predict the value of the predicted field using the user selected fields that were not excluded.

In another embodiment, a computing system comprising a processor and computer readable media encoded with programming instructions configurable to cause the processor to perform a method is provided. The method comprises: providing a user interface for user selection of a predicted field wherein the value of the predicted field is to be predicted by a trained prediction model; providing a user interface for user selection of a plurality of data fields to be used by the prediction model to predict the value of the predicted field; analyzing the one or more user selected data fields for bias against a protected class; enumerating one or more of the user selected data fields as containing a bias against a protected class based on the analyzing; providing a user interface for user selection of one or more of the enumerated fields to exclude from the plurality of fields to be used by the prediction model to predict the value of the predicted field; and training the prediction model to be configurable to predict the value of the predicted field using the user selected fields that were not excluded.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A processor implemented method for excluding biases in data and models, the method comprising:
   providing, by a processor, a user interface for user selection of a predicted field wherein the value of the predicted field is to be predicted by a trained prediction model;
   providing, by the processor, a user interface for user selection of a plurality of data fields to be used by the prediction model to predict the value of the predicted field;
   analyzing, by the processor, the one or more user selected data fields for bias against a protected class, the analyzing comprising:
      automatically detecting and enumerating fields that are predetermined to be biased against a protected class;
      providing a user interface for user provision of a formula for identifying fields determined by the user to be biased against a protected class; and
      analyzing other user selected fields for bias using the user provided formula;
   enumerating, by the processor, one or more of the user selected data fields as containing a bias against a protected class based on the analyzing;
   providing, by the processor, a user interface for user selection of one or more of the enumerated fields to exclude from the plurality of fields to be used by the prediction model to predict the value of the predicted field; and
   training, by the processor, the prediction model to be configurable to predict the value of the predicted field using the user selected fields that were not excluded.

2. The method of claim 1, further comprising:
   analyzing other user selected fields for predetermined attributes that suggest bias against a protected class; and
   enumerating one or more of the user selected plurality of fields as containing a bias against a protected class based on the analyzing other user selected fields for predetermined attributes that suggest bias.

3. The method of claim 2, further comprising:
providing a user interface for user selection of one or more fields determined by the user to be biased against a protected class;
analyzing other user selected fields for attributes consistent with attributes of the one or more fields determined by the user to be biased against a protected class; and
enumerating one or more of the user selected plurality of fields as containing a bias against a protected class based on the analyzing other user selected fields for attributes consistent with attributes of the one or more fields determined by the user to be biased against a protected class.

4. The method of claim 1, further comprising:
determining a bias score for each enumerated field; and
presenting in a user interface each enumerated field and the bias score for each enumerated field.

5. The method of claim 1, wherein the analyzing the one or more user selected plurality of fields for bias against a protected class comprises analyzing the one or more user selected plurality of fields for bias against a protected class using statistical tests to identify relationships that may indicate a bias.

6. The method of claim 5, wherein the statistical tests comprises univariate analyses for continuous or binary variables against protected attributes.

7. The method of claim 6, wherein the univariate analyses comprises correlations or t-tests.

8. The method of claim 5, wherein the statistical tests comprises multi-variate analyses for categorical fields.

9. The method of claim 8, wherein the multi-variate analyses for categorical fields comprises Cramer's V tests.

10. The method of claim 5, wherein the statistical tests comprises multi-variate analyses for text fields.

11. The method of claim 10, wherein the multi-variate analyses for text fields comprises Cramer's V tests.

12. The method of claim 1, wherein the protected class comprises one or more of age, gender, ethnicity.

13. A system for excluding biases in data and models, the system comprising one or more processors configured by programming instructions on computer readable media, the system configured to:
provide a user interface for user selection of a predicted field wherein the value of the predicted field is to be predicted by a trained prediction model;
provide a user interface for user selection of a plurality of data fields to be used by the prediction model to predict the value of the predicted field;
analyze the one or more user selected data fields for bias against a protected class wherein to analyze the system is configured to:
automatically detect and enumerate fields that are predetermined to be biased against a protected class;
provide a user interface for user provision of a formula for identifying fields determined by the user to be biased against a protected class; and
analyze other user selected fields for bias using the user provided formula;
enumerate one or more of the user selected data fields as containing a bias against a protected class based on the analyzing;
provide a user interface for user selection of one or more of the enumerated fields to exclude from the plurality of fields to be used by the prediction model to predict the value of the predicted field; and
train the prediction model to be configurable to predict the value of the predicted field using the user selected fields that were not excluded.

14. The system of claim 13, further configured to:
analyze other user selected fields for predetermined attributes that suggest bias against a protected class; and
enumerate one or more of the user selected plurality of fields as containing a bias against a protected class based on the analyzing other user selected fields for predetermined attributes that suggest bias.

15. The system of claim 14, further configured to:
provide a user interface for user selection of one or more fields determined by the user to be biased against a protected class; and
analyze other user selected fields for attributes consistent with attributes of the one or more fields determined by the user to be biased against a protected class.

16. The system of claim 13, further configured to:
determine a bias score for each enumerated field; and
present in a user interface each enumerated field and the bias score for each enumerated field.

17. The system of claim 13, wherein to analyze the one or more user selected plurality of fields for bias against a protected class the system is configured to analyze the one or more user selected plurality of fields for bias against a protected class using statistical tests to identify relationships that may indicate a bias.

18. Non-transitory computer readable media encoded with programming instructions configurable to cause a processor to perform a method, the method comprising:
providing a user interface for user selection of a predicted field wherein the value of the predicted field is to be predicted by a trained prediction model;
providing a user interface for user selection of a plurality of data fields to be used by the prediction model to predict the value of the predicted field;
analyzing the one or more user selected data fields for bias against a protected class, the analyzing comprising:
automatically detecting and enumerating fields that are predetermined to be biased against a protected class;
providing a user interface for user provision of a formula for identifying fields determined by the user to be biased against a protected class; and
analyzing other user selected fields for bias using the user provided formula;
enumerating one or more of the user selected data fields as containing a bias against a protected class based on the analyzing;
providing a user interface for user selection of one or more of the enumerated fields to exclude from the plurality of fields to be used by the prediction model to predict the value of the predicted field; and
training the prediction model to be configurable to predict the value of the predicted field using the user selected fields that were not excluded.

19. The non-transitory computer readable media of claim 18, further comprising one or more of:
analyzing other user selected fields for predetermined attributes that suggest bias against a protected class and enumerating one or more of the user selected plurality of fields as containing a bias against a protected class based on the analyzing other user selected fields for predetermined attributes that suggest bias; or
providing a user interface for user selection of one or more fields determined by the user to be biased against a protected class, analyzing other user selected fields for attributes consistent with attributes of the one or more fields determined by the user to be biased against a protected class, and enumerating one or more of the user selected plurality of fields as containing a bias against a protected class based on the analyzing other user selected fields for attributes consistent with attributes of the one or more fields determined by the user to be biased against a protected class.

20. The system of claim 16, wherein the statistical tests comprise one or more of:
   univariate analyses for continuous or binary variables against protected attributes;
   multi-variate analyses for categorical fields; or
   multi-variate analyses for text fields.

\* \* \* \* \*